Feb. 5, 1946.  A. A. BALDOCCHI  2,394,226
NAVIGATION COMPUTER
Filed April 3, 1944  4 Sheets-Sheet 1

INVENTOR.
ARCHIE A. BALDOCCHI
BY George B. White
ATTY.

Feb. 5, 1946.  A. A. BALDOCCHI  2,394,226
NAVIGATION COMPUTER
Filed April 3, 1944   4 Sheets-Sheet 2

INVENTOR.
ARCHIE A. BALDOCCHI
BY George B. White
ATTY.

Feb. 5, 1946.　　　A. A. BALDOCCHI　　　2,394,226
NAVIGATION COMPUTER
Filed April 3, 1944　　　4 Sheets-Sheet 3

INVENTOR.
ARCHIE A. BALDOCCHI
BY George B. White
ATTY.

INVENTOR.
ARCHIE A. BALDOCCHI
BY George B. White
ATTY.

Patented Feb. 5, 1946

2,394,226

UNITED STATES PATENT OFFICE 2,394,226

NAVIGATION COMPUTER

Archie A. Baldocchi, San Francisco, Calif.

Application April 3, 1944, Serial No. 529,369

5 Claims. (Cl. 235—78)

This invention relates to a device for navigation computer and particularly to celestial navigation computing during a flight.

Celestial navigation involves the finding of one's position by the sun, moon, planets or stars. It is important in celestial navigation to work at reasonable accuracy and it is still more important to work speedily. The value of celestial navigation, for instance for aircraft capable of 300 miles per hour speed, depends on the navigator's ability to reduce the time between "shot" and plotting a position to a minimum.

The complete process of getting a "bearing" or "line of position" consists of three separate steps. The first step is the taking a "sight" or a "shot," which is the measuring of the angle of the object sighted above the "horizon" by means of an angle measuring device, such as a sextant, or octant, and note the exact time of measurement. The second step is the "solution," namely obtaining certain results from computing several data pertinent to the object observed and to our position. The third step is the plotting of our position.

The object of this invention is to provide a device whereby a solution or result can be obtained by relative setting of superimposed graduations or charts movable relatively to each other so as to quickly indicate the respective elements of the result and the result itself by relative settings of the superimposed charts.

Particularly it is an object of this invention to provide a device for the quick determination of the Greenwich Hour Angle of the first point of Aries for any given time, denoted as GHA; and then from the above and from the Sidereal Hour Angle of the star, denoted as SHA*, the Greenwich Hour Angle of the star, denoted GHA*, and then the Local Hour Angle of the star, denoted LHA*, by relatively setting movable charts bearing suitable graduations in operative relationship, so as to give accurate readings of said factors quickly and without calculation and without separate readings from tables.

Another object of this invention is to provide a navigation computing device which is highly useful and simple in construction. Convenience of arrangement, lightness and comparative inexpense of manufacture are further objects which have been borne in mind in the production and development of the invention.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein.

Figures 1, 2:
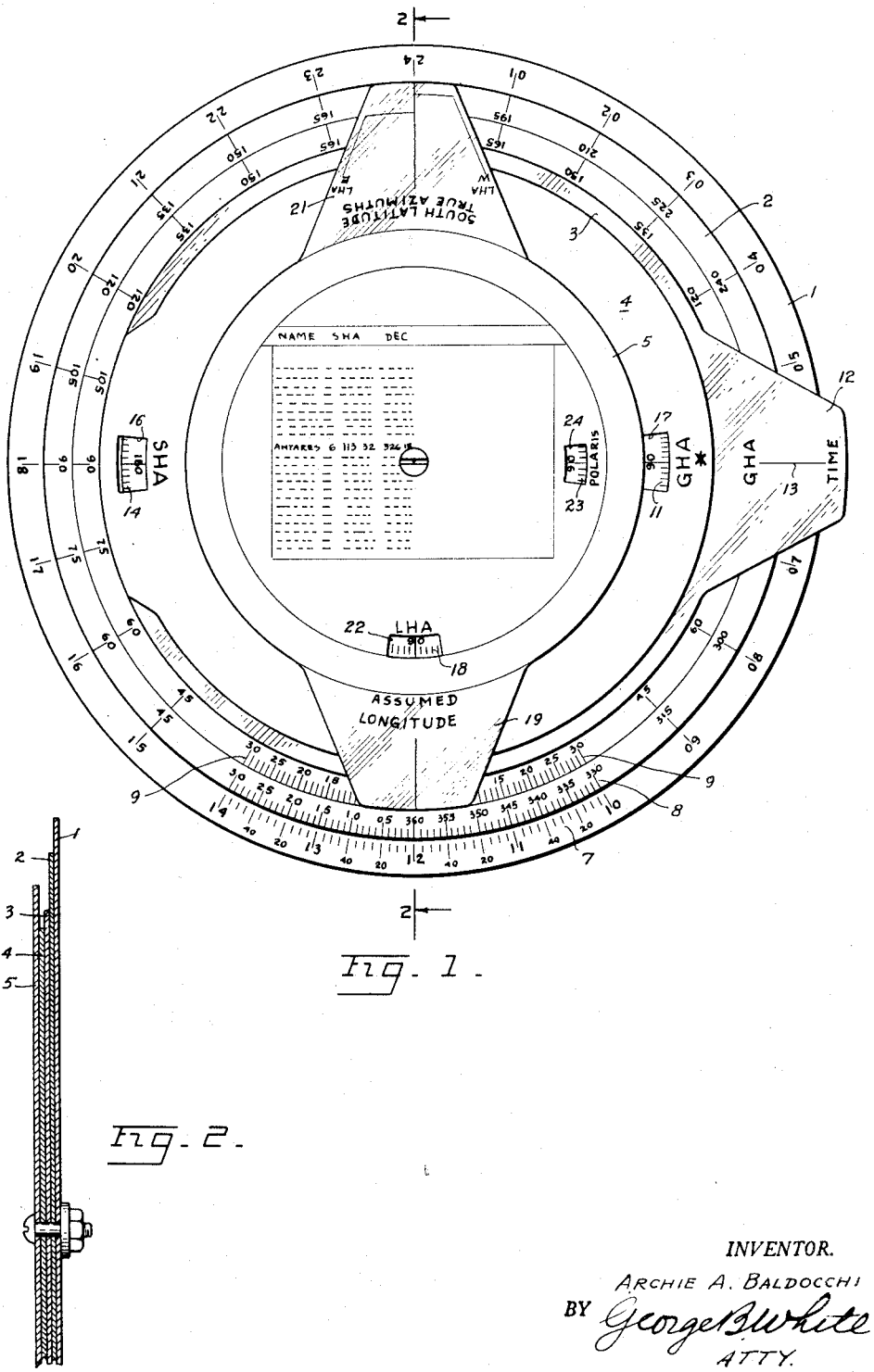
Fig. 1 is an assembly face view of the computer device, showing the graduations in indicating fragments.
Fig. 2 is a cross sectional view, the section being taken on the lines 2—2 of Fig. 1.
Figure 3:
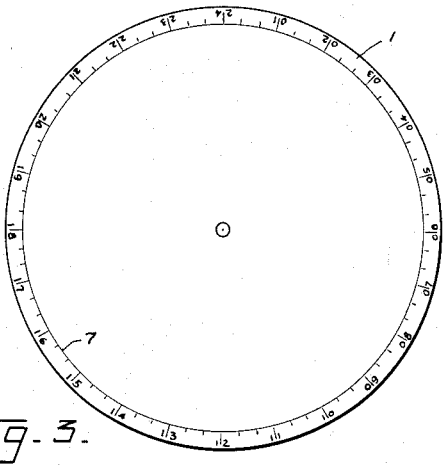
Fig. 3 is a detail view of the first or bottom disk of the device.
Figure 6:
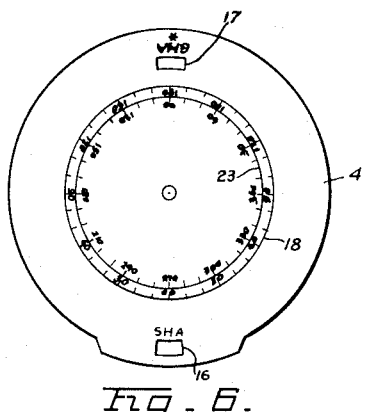
Fig. 6 is a detail view of the fourth disk of the device.
Figure 4:
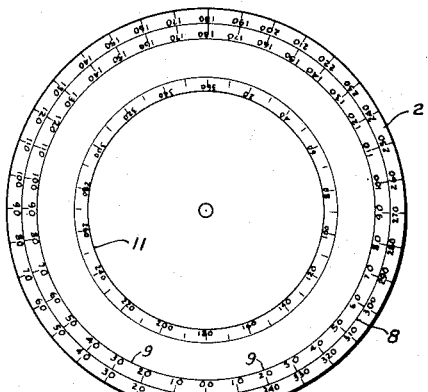
Fig. 4 is a detail view of the second disk overlying said bottom disk of the device.
Figure 7:
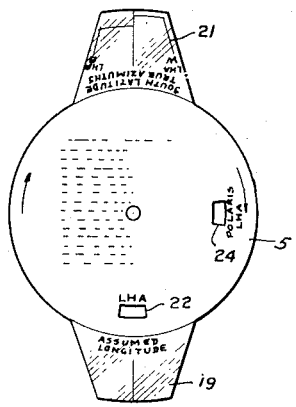
Fig. 7 is a detail view of the top disk of the device.
Figure 5:
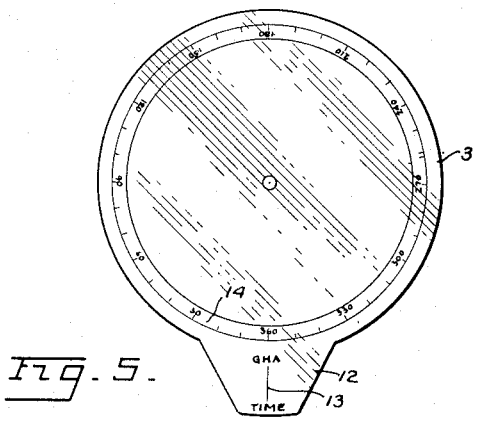
Fig. 5 is a detail view of the third or middle disk of the device.

In order that a navigator may locate the position of his craft on or over the surface of the earth by means of celestial navigation or "avigation," it is necessary for him to solve the astronomical triangle, mathematically or graphically. This is a time consuming process in an operation where speed is essential. Some of the factors involved in this solution of the triangle are the following: Greenwich Hour Angle of the first point of Aries, denoted as GHA, which is the angular distances of the first point of Aries at any instant of time as it makes its daily circuit of the earth westward; Sidereal Hour Angle of the star, denoted SHA*, which is the angular distance, always the same, westward of the star from the first point of Aries. The GHA plus SHA* equals GHA*, or Greenwich Hour Angle of the star; then applying the assumed longitude to the GHA* will result in the LHA*, or Local Hour Angle of the angle of the star, the angular distance east or west 0° to 180° from the observer's meridian. This LHA* is one of the very necessary arguments used to enter navigational tables in order to compute the altitude of the star at the time of the actual measurement of said altitude of the star with an octant or sextant. One of the exceptions to the above procedure is the computation of the altitude of Polaris, because for the Polaris it is only necessary to find the LHA 0° to 360° W. The LHA's of other stars are 0° to 180° E. or W. To find the LHA of the sun, moon or planets the GHA is set directly, no GHA of Aries or SHA of the star is used.

Proper application of the LHA* and declination (latitude is assumed) to the altitude and azimuth tables will result in the computed altitude and azimuth of the observed star. When this is applied to the observed or sextant altitude an altitude intercept which when plotted on the chart will show the line of position of the observer. Two such lines will indicate the exact position of the observer.

The applying of these various factors and data to obtain the LHA solution requires either mathematical or graphical computation. Such computation is entirely obviated by my device.

In carrying out my invention I make use of a plurality of superimposed disks, 1, 2, 3, 4, and 5, so formed that the disks above the first disk leave the margins of the lower disks suitably exposed for instance by reason of successively diminishing diameters. These disks are concentrically held together on a central journal 6. The disks are provided with suitable graduations and indicators coacting when the disks are rotated relatively to one another to selected positions.

The bottom disk 1 is the largest and is provided near its outer periphery with a circle of equally spaced graduations or markings 7, numbered consecutively in clockwise direction corresponding to 24 hours, viewing the face of the device. The space corresponding to each hour is subdivided in 60 graduations corresponding to the minutes of the hour. In larger devices this may further be subdivided, or in devices of the size shown, a mechanical means for reading smaller subdivisions, such as a vernier scale, or reduction gearing may be employed, although for average measurements, where this illustrative embodiment of the chart is used, subdivision to minutes will suffice.

The second disk 2 immediately above the first disk 1 is of smaller diameter so that the outer edge of the second disk is adjacent the hour and minute markings 7 of the first disk 1. This second disk 2 has circularly arranged graduations or markings 8 so that the circle is divided into 360 divisions, in this illustration numbered consecutively for each 5 degrees in clockwise direction viewing the face of the device. The space corresponding to each 5 degrees bears markings to indicate the five individual degrees and also half degrees between each pair of adjacent degree markings. It is to be noted that each fifteen degree arc of the circle corresponds to one hour of time. The first and the second disks 1 and 2 therefore may be used for reading quick conversions from time to degrees or vice versa by aligning their 0 indices and reading directly.

This second disk 2 has on it, adjacent and within the outer circle of degree markings 8, a pair of contiguous semicircular sets of degree graduations, each half being 0° to 180°. Both half circle graduations 9 begin opposite the 360° marking of the outer circle of degree graduations 8. One of the half circle sets 9 indicates 0° to 180° in clockwise direction viewing the face of the device, the other indicates the contraclockwise direction. The opposed half circles of these markings are preferably distinguished from each other, for instance by coloring differently and distinctly the respective halves so as to indicate east and west directions. The clockwise half may be in red color and the contraclockwise half in yellow color. Spaced radially toward the center from the semicircular sets of graduations 9 is still another graduated circle 11 divided into 360 degree graduations and marked to begin and end in radial registry with the 180° mark of the outer graduation circle 8 of the second disc 2. In view of the coaction of these graduations for different indications the sets of semicircular graduations shall be termed as longitude graduations, and the inner circle of graduations, the GHA* graduations.

The third superimposed disk 3 is preferably transparent at least at the circular portion above the GHA* circle 11. A transparent indicator ear 12 extends from disk 3 to overlap the underlying disks 1 and 2. The outer portion of the hairline 13 of this ear 12 is marked "Time," and is adapted to be set opposite the hour and minute on the hour markings 7 according to the time of taking the measurements. At the inner end of this hairline 13 is a legend indicating GHA, on the degree circle 8. Spaced from periphery of this third disk 3 is another clockwise degree graduation circle 14 for 360°, which we may term as SHA circle of graduations.

The fourth superimposed disk 4 overlies and covers the SHA circle 14 but has a sighting aperture 16 at the same radial distance from the central journal of the discs as the radius of the SHA circle 14, so that the sighting aperture 16 of the fourth superimposed disk 4 can be set over the circle of SHA graduations 14 according to the Sidereal Hour Angle of the star used in the measurements. This aperture 16, therefore, is also marked "SHA."

This fourth disk 4 has another sight aperture 17 marked GHA*, to take readings on the GHA* circle 11 of the second disk 2 which is visible through the transparent portions of the third disk 3 for taking a reading of the Greenwich Hour Angle of the star. Complemental sets of half circle graduations 18 are provided on the fourth disk 4. Said half circles are divided into 180° graduations in opposite directions beginning at the radius of the SHA sight and their 180° opposite the GHA* sight aperture. The respective half circles of graduations 18 are colored distinctly, and are termed LHA graduations.

The fifth, or top disk has diametrically opposite ears 19 and 21. The ear 19 has a radial hairline marker to indicate "assumed longitude" on the longitude half circle sets 9, on either east or west assumed longitude. The other ear 21 extends over the outer most degree graduations 8 of the second disk 2 for latitude and azimuth readings in the manner hereinafter described. This top disk has a sighting aperture 22 on the same radius as the radius of the LHA half circles 18 on the fourth disk 4, to give an east or west reading of the result or Local Hour Angle of the star.

A graduated circle 23 on the fourth disk 4 is of smaller diameter than the LHA half circles 18, is graduated into 360 degrees in contraclockwise sequence viewing the face of the device and in this illustration is offset 90 degrees in contraclockwise direction from the 0 graduations of said LHA half circles 18.

A sight aperture 24 in the top disk 5 is at the same radius as the last mentioned smaller circle 23 for readings of the LHA of Polaris, as hereinafter described. The Polaris sight aperture 24 is also offset 90 degrees contraclockwise from the LHA sight aperture 22.

On the face of the top disk are data for the manipulation of the device. The stars commonly used for navigation are listed with their respective SHA and the declination of each star.

In operation, for instance, if the star is Antares. The time of "shooting" the star is 03:00 Greenwich time on April 15, 1943. The angle of first point of Aries from the Almanac is determined as 247° 24', and this angle of the second disk is set to 03:00 of the first disk, and this setting is fixed by a tape or the like. Then rotate the third disk until its pointer is aligned with the time of shooting. This aligns the starting point of the circle graduations for SHA with the GHA at the time of shooting. Then rotate the 4th disk until the hairline in the sight aperture SHA is in registry with the SHA of Antares for the date and time as taken from the Almanac. This setting automatically applies the SHA to the GHA for the time of shooting, and 180° opposite from the SHA reading, the GHA* aperture shows on the innermost GHA* circle of the second disk, through the transparent 3rd disk, the GHA* of the star Antares. This also sets the graduated circle on the 4th disk in proper relation. Now turn the top disk until its ear 19 of assumed longitude is aligned with the graduation on the east or west half of the 180° graduations on the second disk corresponding to the longitude assumed by the aviator. The LHA of the star is shown through the LHA opening 22 of the top disk 5.

For sun or moon or planets, the steps are the same as heretofore described except that SHA the sight of the 4th disk is aligned with the 0 or 360 degree indication of the SHA circle, and both are radially aligned with the GHA of the time of shooting.

For Polaris the step of SHA setting at 0 or 360° applies just as in connection with the sun, but reading is taken through the Polaris sight aperture 24 at right angles to the assumed longitude line, and on the inner Polaris circle of contraclockwise graduations 23 of the 4th disk 4.

For azimuth conversions in north latitudes, in eastern longitudes, azimuths are true as tabulated. In western longitudes the true azimuths must be computed from the tabulated azimuth. For this purpose set the hairline of the azimuth ear of the top disk over the tabulated azimuths and on the contraclockwise longitude half circle on the second disk, and the true azimuth can be read directly on the adjacent outside degree scale of the second disk.

In south latitudes, and eastern longitude set the hairline of the assumed longitude ear of the top disk on the tabulated azimuth on the clockwise half circle of longitude of the second disk, and read the true azimuth diametrically opposite at the hairline of the azimuth ear on the contraclockwise longitude half circle. In west longitudes set azimuth ear to tabulated azimuth on clockwise half circle of the second disk, and read true azimuth off the corresponding degree scale of the second disk opposite the azimuth ear.

Figure 8:
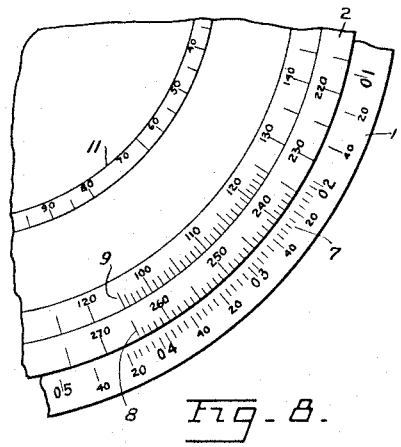
Fig. 8 is a fragmental view showing a setting of the bottom and the next superimposed disks for a given hour and date and secured in said setting.

In Figures 8 to 11 of the drawings a series of settings on the computer are illustrated with respect to the star Antares on April 15, 1943. The first and second disks 1 and 2 are set to correspond to the angle of first point of Aries for that date. In the Almanac it is found for instance that on April 15, 1943, at 03:00 Greenwich time the angle of first point of Aries is 247°24'. The second disk 2 is rotated on the first disk 1 until the graduation 247°24' of the circle 8 on the second disk 2 is aligned with the graduation 03 of the circle 7 on the first disk 1. The first and second disks 1 and 2 are then fastened together in this set position by an adhesive tape and the like for all measurements for that day. Any hour of that day and its corresponding almanac reading of the angle of first point of Aries may be used because once so set to any given hour and its angle, the readings for all the hours of that day can be taken from the same setting of the disks 1 and 2, without the need for any further reference to the almanac on that day. The existing difference of 3.56' between twenty-four hours of the solar day and the sidereal day is negligibly small. A fragmental view of this setting of disks 1 and 2 is shown in Fig. 8.

Figure 9:
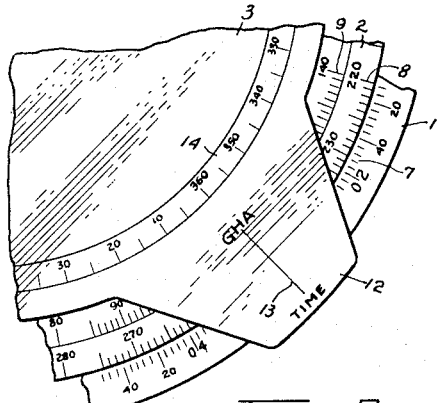
Fig. 9 is a fragmental view showing the relative setting of the third disk or dial to a given time.

Assuming that the star Antares was shot by sextant at 03:00 Greenwich time, the time pointer 12 of the third disk 3 is now set to 03.00 on the circle of graduation 7 of the first disk 1, as shown in Fig. 9.

Figure 10:
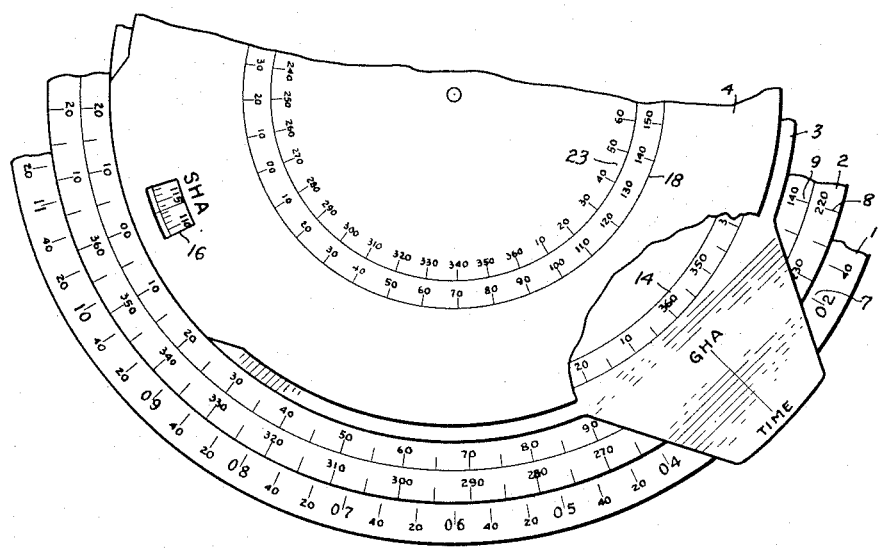
Fig. 10 is a fragmental view showing the second disk from the top, set to a given SHA of the star and showing the corresponding reading of GHA of the star.

Then the sidereal hour angle of the star Antares is determined from almanac data as 113°32' and the SHA window 16 of the fourth disk 4, the second from the top, is set over the 113°32' graduation of the circle of graduations 14 thereunder on the third disk 3 as shown in Fig. 10. It is to be noted that the SHA of the stars is listed on the top disk of the computer for convenience.

Figure 11:
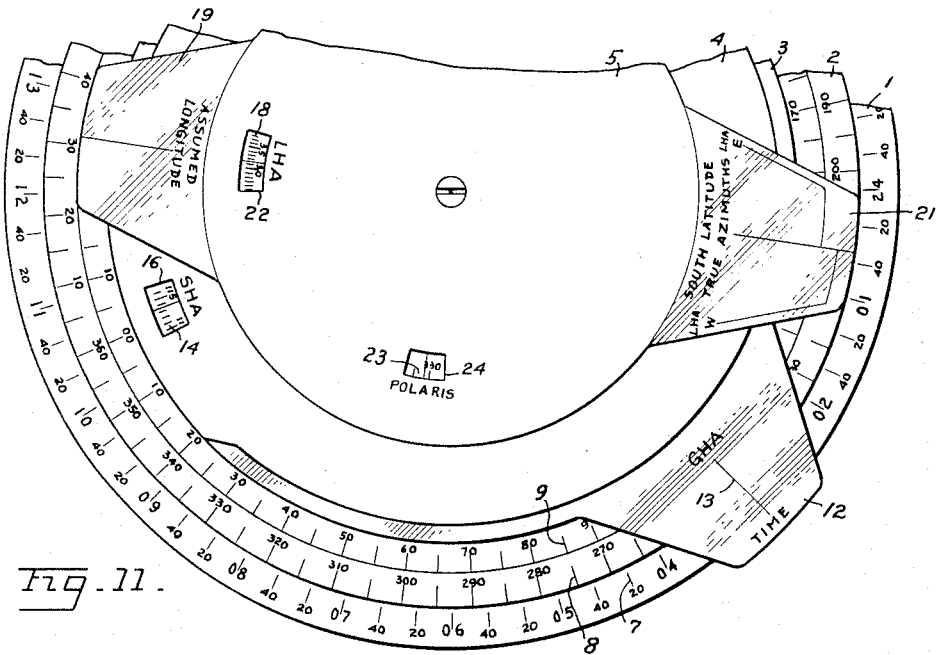
Fig. 11 shows the relative setting of the top disk to the assumed longitude on the disk next to the bottom disk and the LHA reading of the star.

The assumed longitude in the example is 31°22' W. The longitude pointer 19 of the top disk 5 is set to 31°22' W. on the west half circle of graduations 9 of the second disk 2 as shown in Fig. 11. The aligned LHA window 22 reads now on the east half circle of graduations 18 on the third disk 3 the local hour angle of 32°18' E. In view of the desirability of charting the LHA in whole degrees, now the assumed longitude pointer 19 is readjusted until the LHA window 22 indicates the whole degree next to said 32°18'. When the minutes in this LHA result are thirty minutes or below, then the assumed longitude is corrected, and the longitude pointer 19 is readjusted until the LHA window 22 indicates the next smaller whole degree in this instance 32°. When the minutes in the LHA result are above thirty minutes the assumed longitude pointer 19 is readjusted until the LHA window indicates the next higher whole degree, which for instance in case of 32°31' would be an adjustment for the whole degree of 33°. The adjusted assumed longitude, and the resultant whole degree LHA are then used in the tables for finding altitude and azimuth.

Figure 12:
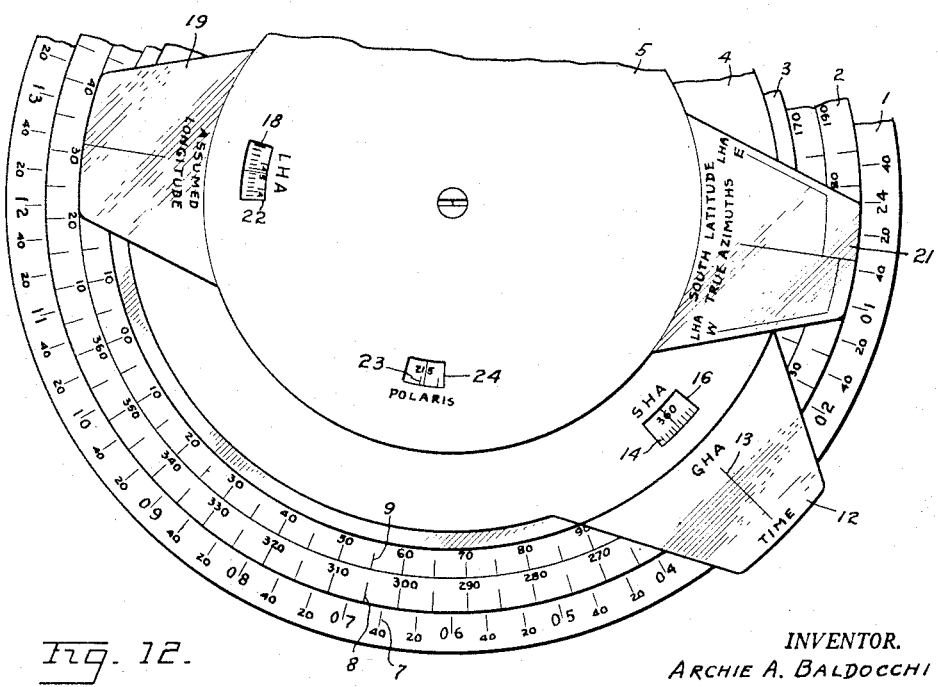
Fig. 12 is a fragmental view of the same setting with SHA set to "0" of the graduation on the third disk, and showing the corresponding reading of LHA of Polaris.

In Fig. 12 are shown the settings for determining the LHA of Polaris for the same conditions as the previous example. The settings of the first, second and third disks are the same as described in connection with the example computation on Antares, but the fourth disk 4 is now set with its SHA window 16 aligned with the 360° or 0° mark on the circle of graduations 14 beneath it. Then the longitude pointer 19 is set to the assumed longitude 31°22' W. In this setting the Polaris LHA window 24 on the top disk 5, spaced ninety degrees from the star LHA window 22, indicates on the innermost full circle of graduations 23 of the fourth disk 4 the LHA of Polaris as 216° W. In the event the result were not in whole degrees, then the assumed longitude pointer 19 would have to be reset to give the next smaller or higher whole degree reading at the Polaris LHA window 24, respectively when the minutes were thirty minutes or under, or over thirty minutes, as heretofore described with the previous LHA result in the Antares example.

I claim:

1. In a celestial navigation computer, a plurality of disks superimposed one on the other, each superimposed disk being of smaller diameter than the diameter of the disk immediately beneath it; the largest disk having a circle of time graduations divided equally into twenty-four hours and parts of the hours, the second disk having on its face near its periphery arc graduations dividing the circle into 360 degrees, said second disk also having thereon longitude graduations of 0 degrees to 180° on half circles in opposite directions adjacent said arc graduations and having Greenwich Hour Angle graduations on a circle spaced inwardly from said longitude graduations and divided in 360 degrees so arranged as to be offset 180 degrees with respect to said arc graduations; the third disk covering said Greenwich Hour Angle graduations but leaving said arc graduations and longitude graduations exposed and having on its face, spaced from its outer periphery a circle of a Sidereal Hour Angle graduations of 0 to 360 degrees, an indicator extended radially from said third disk in radial alignment with the starting point of said Sidereal Hour Angle graduations and overlapping the circle of time graduations of the first disk and the longitude graduations of the second disk, said third disk being transparent at least at a circular portion thereof in registry with said circle of Greenwich Hour Angle graduations of the second disk; a fourth disk covering said circle of Sidereal Hour Angle graduations and having sight opening thereon at the same radial distance as the radius of said circle of Sidereal Hour Angle graduations, and also having a sight opening on the same radius as that of the circle of Greenwich Hour Angle graduations of the second disk, said fourth disk having thereon opposed and contiguous half circle sets of Local Hour Angle graduations each from 0 degree to 180 degrees, a top disk having a sight opening at the radius of said half circles local hour angle graduations, and means to centrally and rotatably unite said superimposed disk.

2. In a celestial navigation computer, a plurality of disks superimposed one on the other, each superimposed disk being adapted to leave the outer margins of the disks beneath it exposed to view; the lowest disk having near its periphery a circle of time graduations to indicate twenty-four hours; the second disk having near its outer periphery and adjacent to said time graduations a circle of arc graduations dividing the circle in 360 degrees, said second disk having on its exposed margin opposed half circle longitude graduations, and having spaced inwardly therefrom a concentric circle of Greenwich Hour Angle graduations of 360 degrees; the third disk having a circle of Sidereal Hour Angle graduations of 360 degrees; indicator extending radially from said third disk and in radial alignment with starting point of Sidereal Hour Angle graduations and overlapping the exposed margins of the first and second disks; said third disk being adapted to expose to view therethrough the Greenwich Hour Angle graduations of the second disk; a fourth disk having a sighting device at a radial distance from its center equal to the radius of said circle of Sidereal Hour Angle graduations, and having another sight device at a radial distance equal to the radius of said circle of Greenwich Hour Angle graduations of said second disk, and having contiguous half circles of Local Hour Angle graduations, each half circle of graduations being from 0 degree to 180 degrees, the sequence of the graduations of one half circle being in opposite direction to the sequence on the other half circle; a top disk, Local Hour Angle sighting means in said top disk arranged at the same radius as the radius of said half circles of graduations on the fourth disk; an indicator extended radially from said top disk and in radial alignment with said Local Hour Angle sighting means and extending substantially to the marginal graduations of the second disk; and central journal means to concentrically but rotatably hold said disks together.

3. In a celestial navigation computer, a plurality of disks superimposed one on the other, each superimposed disk being adapted to leave the outer margins of the disks beneath it exposed to view; the lowest disk having near its periphery a circle of time graduations to indicate twenty four hours; the second disk having near its outer periphery and adjacent to said time graduations a circle of arc graduations dividing the circle in 360 degrees, said second disk having on its exposed margin opposed half circle longitude graduations, and having spaced inwardly therefrom a concentric circle of Greenwich Hour Angle graduations of 360 degrees; the third disk having a circle of Sidereal Hour Angle graduations of 360 degrees; an indicator extending radially from said third disk and in radial alignment with the starting point of the Sidereal Hour Angle graduations and overlapping the exposed margins of the first and second disks; said third disk being adapted to expose to view therethrough the Greenwich Hour Angle graduations of the second disk; a fourth disk having a sighting device at a radial distance from its center equal to the radius of said circle of Sidereal Hour Angle graduations, and having another sight device at a radial distance equal to the radius of said circle of Greenwich Hour Angle graduations of said second disk, and having contiguous half circles of Local Hour Angle graduations, each half circle of graduations being from 0 degree to 180 degrees, the sequence of the graduations of one half circle being in opposite direction to the sequence on the other half circle; a top disk, Local Hour Angle sighting means in said top disk arranged at the same radius as the radius of said half circles of graduations on the fourth disk; an indicator extended radially from said top disk and in radial alignment with said Local Hour Angle sighting means and extending substantially to the marginal graduations of the second disk; and central journal means to concentrically but rotatably hold said disks together; and an azimuth indicator extending from said top disk diametrically opposite to said longitude indicator and substantially to the full circle degree graduations on the margin of the second disk so as to coact with said longitude indicator said half circle and full circle marginal graduations of said second disk for taking readings of true azimuth both in north and south latitudes and both for LHA east and west.

4. In a celestial navigation computer, a plurality of disks superimposed one on the other, each superimposed disk being adapted to leave the outer margins of the disks beneath it exposed to view; the lowest disk having near its periphery a circle of time graduations to indicate twenty four hours; the second disk having near its outer periphery and adjacent to said time graduations a circle of arc graduations dividing the circle in 360 degrees, said second disk having on its exposed margin opposed half circle longitude graduations, and having spaced inwardly therefrom a concentric circle of Greenwich Hour Angle graduations of 360 degrees; the third disk having a circle of Sidereal Hour Angle graduations of 360 degrees; an indicator extending radially from said third disk and in radial alignment with starting point of Sidereal Hour Angle graduations and overlapping the exposed margins of the first and second disks; said third disk being adapted to expose to view therethrough the Greenwich Hour Angle graduations of the second disk; a fourth disk having a sighting device at a radial distance from its center equal to the radius of said circle of Greenwich Hour Angle graduations, and having another sight device at a radial distance equal to the radius of said circle of Greenwich Hour Angle graduations of said second disk, and having contiguous half circles of Local Hour Angle graduations, each half circle of graduations being from 0 degree to 180 degrees, the sequence of the graduations of one half circle being in opposite direction to the sequence on the other half circle; a top disk, Local Hour Angle sighting means in said top disk arranged at the same radius as the radius of said half circles of graduations on the fourth disk; an indicator extended radially from said top disk and in radial alignment with said Local Hour Angle sighting means and extending substantially to the marginal graduations of the second disk; and central journal means to concentrically but rotatably hold said disks together; said fourth disk having on its face a circle of Polaris longitudinal hour angle graduations of 0 to 360 degrees in contraclockwise sequence viewing the face of the disk; and sighting means on said top disk at the same radius as the radius of said Polaris circle for taking readings on the latter.

5. In a navigation computer a disk having near its outer periphery graduations arranged on a circle to divide the circle into equal 24 spaces corresponding to the 24 hours of a day and marked successively in clockwise direction viewing the face of the disk, and subgraduations to subdivide the spaces between said hour graduations into minutes and parts of the minutes; a second disk superimposed on the first disk having its outer periphery smaller than, but adjacent and concentric with the hour graduations of the first disk, said second disk having near its outer periphery graduations arranged on a circle dividing the circle into 360 degrees in clockwise direction viewing the face of the disk, and having adjacent said degree graduations a pair of contiguous semicircles divided by graduations from zero to 180 degrees in opposite directions one to the other, the zero marks of both of said graduations being aligned with the 360 degree mark of said degree graduation of said second disk, said second disk also having a circle of 360 degree graduations spaced inwardly on the disk from said semicircular graduations and arranged in clockwise sequence viewing the face of the disk so that the 180 degree mark is in radial alignment with the "0" mark of said semicircular graduations; a third disk superimposed on the second disk being transparent at least on its portion overlying said inner most circle of graduations of the second disk and exposing the outer semicircle and circle graduations of the second disk, and having a circle of graduations for 360 degrees in clockwise direction viewing the face of the disk, a GHA of the first point of Aries and time indicator extended radially from said third disk to overlap the outer circles of graduations of the first and second disks, said indicator being in part at least transparent; a fourth disk superimposed on the third disk so as to leave exposed the outer graduations of the second disk, but cover said circle of graduations of the third disk and the innermost circle of graduations of the second disk, said fourth disk having a viewing aperture therethrough on the same radius as the radius of the circle of graduations on the third disk for the reading of the Star Hour Angle, and having a second viewing aperture diametrically opposite the first viewing aperture and on the same radius as the radius of the innermost circle of graduations of the second disk for the reading of the Greenwich Hour Angle of the star said fourth disk having a pair of contiguous semicircle of graduations each of zero to 180 degrees in opposite directions and spaced from the outer periphery of the fourth disk; and a top disk superimposed on the fourth disk and having a radial indicator extended therefrom to indicate the assumed longitude on the semicircle graduations on said second disk; and having a viewing aperture thereon on the same radius as the radius of said semicircle of graduations on the fourth disk to indicate LHA; and having a second indicator diametrically opposite to the first indicator of said top disk extended radially over the outer graduations of the second disk for readings of latitudes and true azimuths; and means to concentrically hold together said disks with freedom of relative concentric turning.

ARCHIE A. BALDOCCHI.